Figure 1:
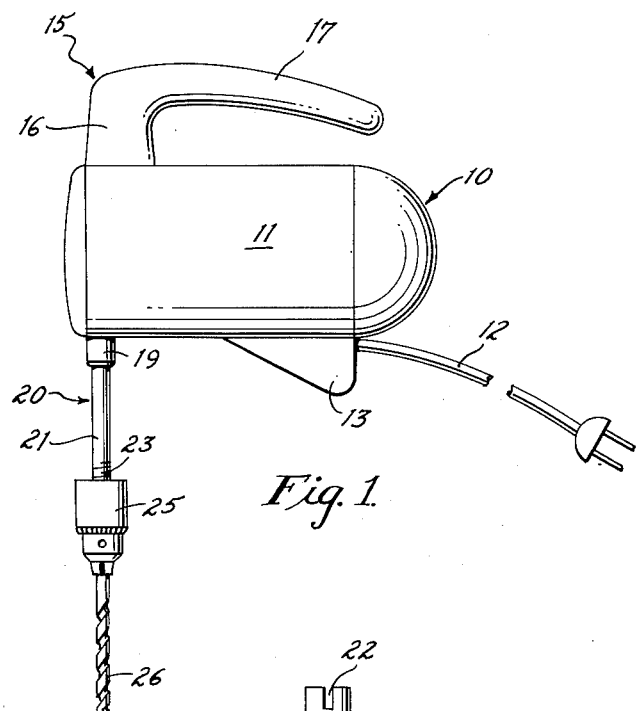

Oct. 2, 1962  M. MURPHY  3,056,316
DRILL ATTACHMENT FOR MOTORIZED APPLIANCE
Filed May 18, 1960

INVENTOR.
MICHAEL MURPHY
BY Robert K. Youtie
ATTORNEY.

United States Patent Office 3,056,316
Patented Oct. 2, 1962

3,056,316
DRILL ATTACHMENT FOR MOTORIZED APPLIANCE
Michael Murphy, 5038 Palmers Road, Clifton Heights, Pa.
Filed May 18, 1960, Ser. No. 29,866
1 Claim. (Cl. 77—55)

This invention relates generally to power tools, and is especially concerned with an attachment for converting a motorized household mixer into a power tool.

As is well-known, a conventional type of household mixer is adapted to be held by hand, and which includes motive means in the form of an electric motor. It is conventional in such electric mixers to provide a handle on one side of the motor housing, and that the beaters extend from the other side of the motor housing generally normal to the handle. It has been discovered that this arrangement is uniquely suited for the application of manual force endwise of the beaters by an operator holding the handle. It is such force as is advantageously utilized in a conventional electric hand drill.

It is therefore one object of the present invention to provide novel means for converting a household electric mixer to an electric hand drill. The instant invention also contemplates the utilization of an electric household mixer as a variety of other motorized tools employing an axially rotating spindle and chuck.

It is another object of the present invention to provide an attachment for a household electric mixer to convert the same to use as an electric drill and other rotary tools.

It is still another object of the present invention to provide a novel structure for the conversion of a household electric mixer to other uses, which structure has the advantageous characteristics mentioned in the preceding paragraphs, and which is extremely simple in construction, durable and entirely reliable in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claim.

Figure 2:
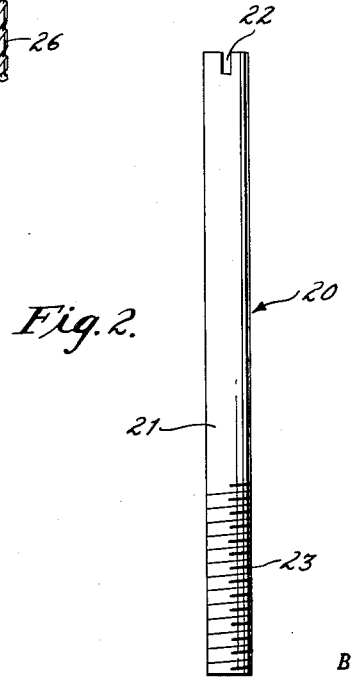

In the drawings:

FIGURE 1 is a side elevational view showing a domestic electric mixer converted for use as a drill in accordance with the teachings of the present invention; and FIGURE 2 is a longitudinal view showing an attachment of the present invention employed in conversion of a domestic electric mixer for use as a power tool.

Referring now more particularly to the drawings, and specifically to FIGURE 1 thereof, a mixer is there generally designated 10 and includes a housing or body 11 encasing an electric motor. The housing 11 may be of a somewhat cylindrical or elongate configuration and provided with an electric power conductor or cord 12 extending from its rear-end region for connection to a source of electric power. As illustrated, the electric cord 12 extends from a boss or projection 13 depending from the underside of the housing 11.

On the upper side of the housing 11 is a handgrip or handle, generally designated 15. The handle includes a portion 16 secured fast by any suitable means to the housing 11 adjacent to the forward end thereof and extending upward away from the housing. The handle 15 also includes an elongate portion or arm 17 preferably integral with and extending rearward from the upper or outer end of the handle portion 16 generally longitudinally of and spaced above the housing 11.

On the other side of the housing 11, adjacent to the forward end thereof, and approximately diametrically opposite to the handle portion 16, there may be a coupling socket 19 specifically constructed to removably receive the ends of beater rods. Any suitable mechanism may be provided internally of the socket 19 for detachably connecting the ends of the beater rods in axially driven relation with the motor.

Referring now to FIGURE 2, an attachment member is there generally designated 20, and includes an elongate member or rod 21 having one end slotted, as at 22, the upper end in the illustrated embodiment. The slot 22 is provided for interfitting engagement in the socket 19; and, it is appreciated that other formation or mechanism may be employed for such interfitting engagement, as required.

On the other, lower end of the attachment rod 21 there are advantageously provided external screw threads 23.

Referring again to FIGURE 1, the attachment rod 21 is shown as having one end engaged in the socket 19 to be axially rotated by the electric motor of the mixer 10. It will be noted that the attachment rod or member 21 is in general alignment with the outstanding portion 16 of the handle 15, and disposed transversely of and approximately at a right angle with respect to the major handgrip portion or arm 17 of the handle.

Threadedly engaged on the lower depending end of the attachment member or rod 21 is a chuck 25, which may be of any desired construction, say a geared, key-operated chuck. The chuck 25 is provided with an internally threaded socket in its upper end for threaded engagement with the external screw threads 23; and of course, the latter are of the proper hand to resist unscrewing upon motor-driven rotation of the attachment member or rod 21.

A drill bit 26 is illustrated as held in the chuck 25, depending therefrom and in alignment with the attachment member or rod 21. Thus, the assembly of FIGURE 1 illustrates the attachment 20 employed in conversion of the mixer 10 for use as a power hand drill. It is, of course, appreciated that different elements may be carried by the chuck 25, or by the rod 21 to convert the mixer 10 for a wide variety of other uses.

From the foregoing it is seen that the present invention provides an attachment for a motorized domestic appliance such as a household mixer which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claim.

What is claimed is:

A drill attachment for a motorized appliance, said attachment comprising a solid elongate shank having a cross-slot at one end for insertion into a motorized household mixer for axial rotation thereby, external screw threads on said shank adjacent to the other end thereof, and a chuck on said other end of said shank for holding a tool, said chuck being formed with internal screw threads interengageable with said external screw threads for securing said chuck to said shank, said internal and external screw threads being of a hand to tighten upon rotation of said shank by said appliance.

References Cited in the file of this patent

UNITED STATES PATENTS

| | | |
|---|---|---|
| 241,784 | Brooks | May 24, 1881 |
| 1,030,592 | Leland | June 25, 1912 |
| 1,479,325 | Schubnel | Jan. 1, 1924 |
| 2,610,513 | Podell | Sept. 16, 1952 |
| 2,752,965 | Mackey | July 3, 1956 |

FOREIGN PATENTS

| | | |
|---|---|---|
| 830,313 | Germany | Feb. 4, 1952 |